United States Patent Office 3,736,348
Patented May 29, 1973

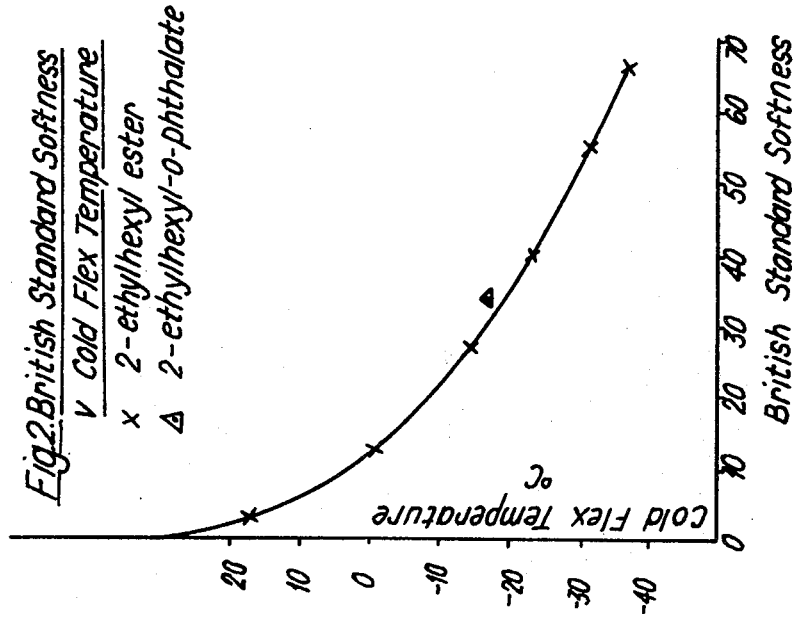
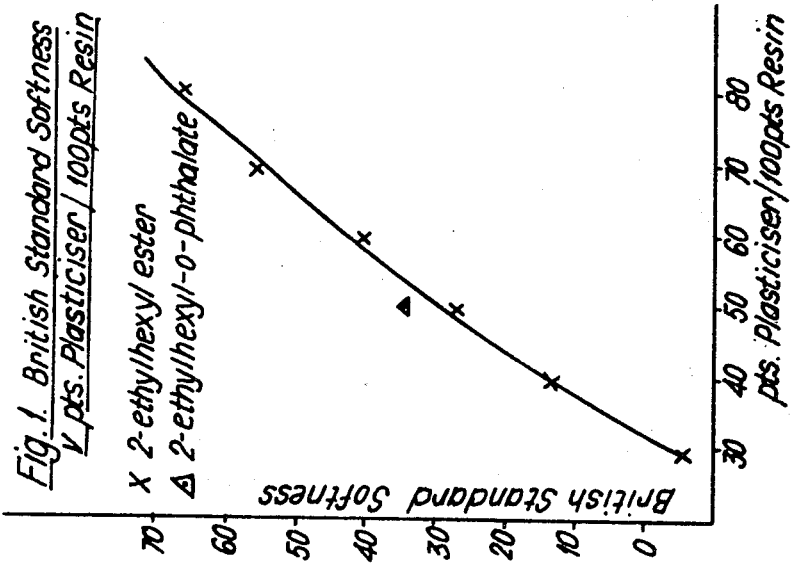

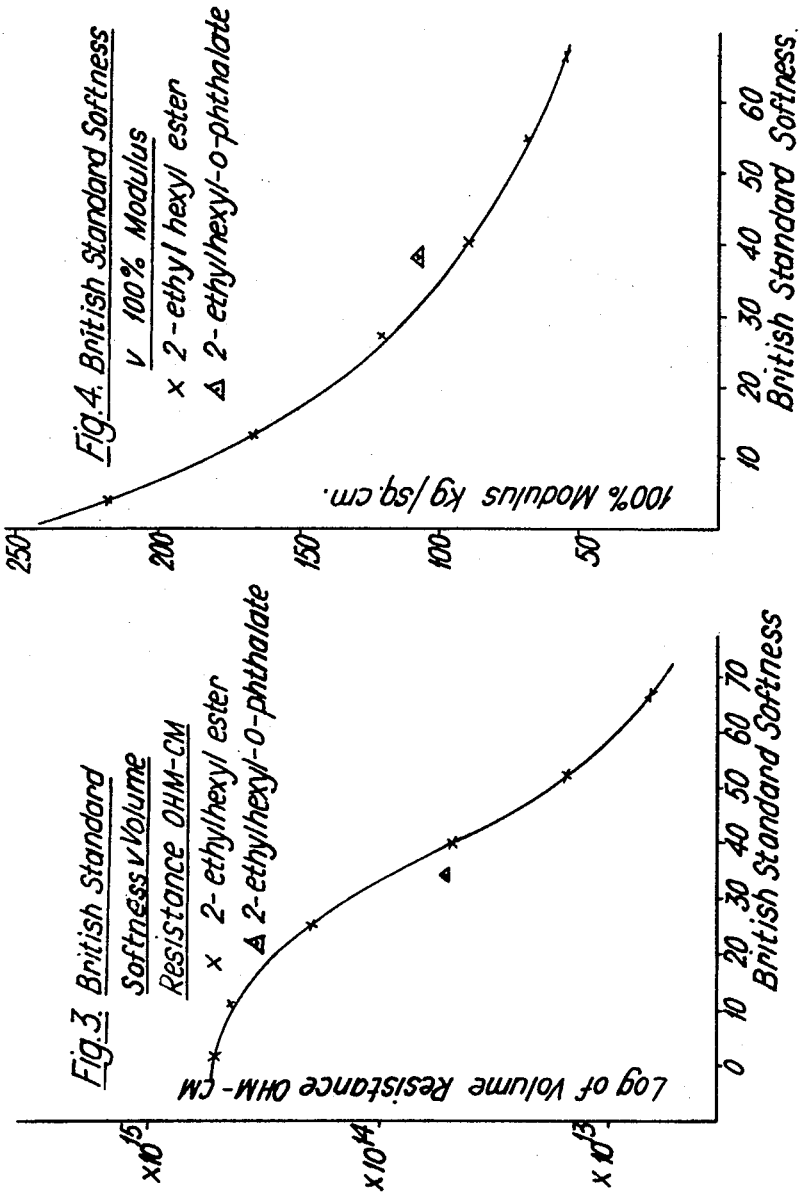

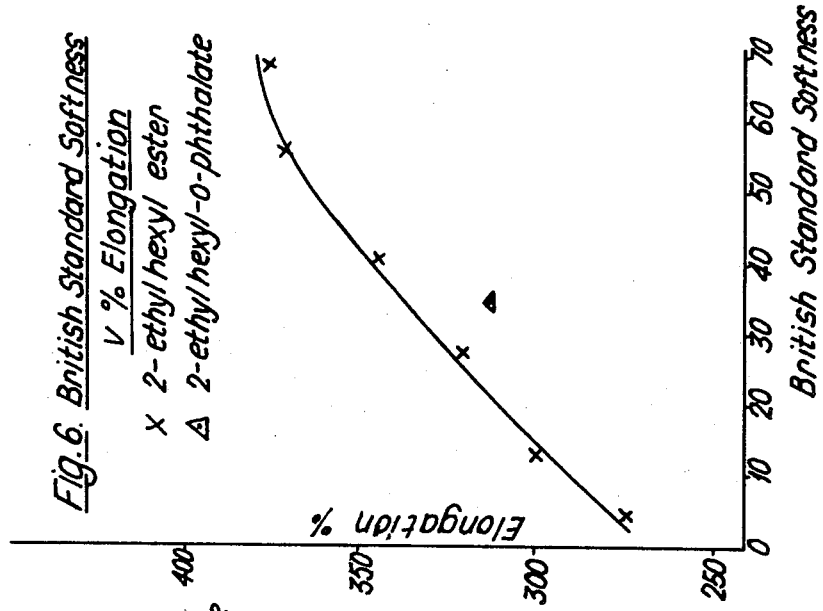
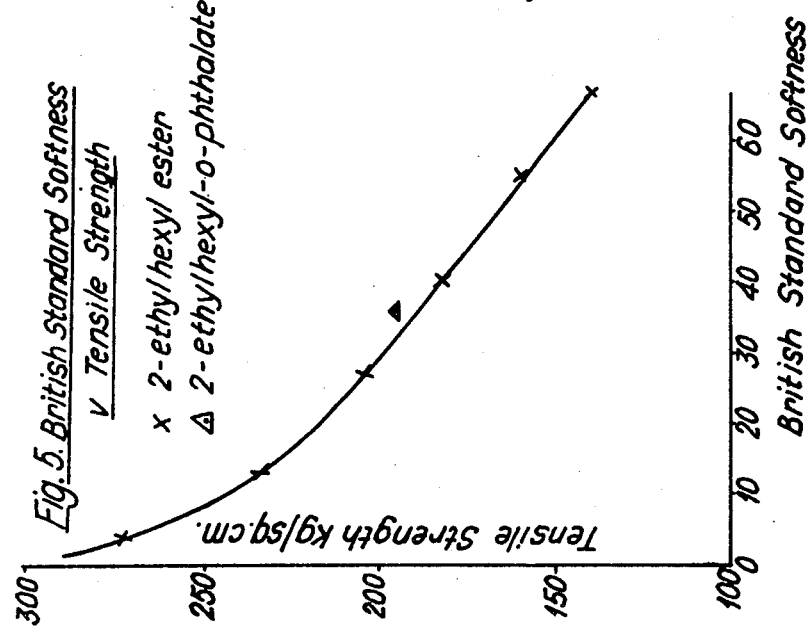

---

3,736,348
PLASTICISING COMPOSITION
Arthur Gough and Alan John Tompsett, Stockton-on-Tees, England, assignors to Imperial Chemical Industries Limited, London, England
Filed Aug. 20, 1970, Ser. No. 65,479
Claims priority, application Great Britain, Aug. 27, 1969, 42,710/69
Int. Cl. C07c 69/80
U.S. Cl. 260—475 R    7 Claims

ABSTRACT OF THE DISCLOSURE

A plasticising composition suitable for use in PVC comprises di-esters of one or more $C_4$–$C_{14}$ alkanols, particularly primary alkanols, with a mixture of acids including or consisting of o-phthalic, iso-phthalic, terephthalic, trimesic and trimellitic acids. The mixture of acids is advantageously obtained by oxidising a $C_8$ to $C_{10}$ alkylaromatics fraction obtained as byproduct in benzene, toluene and xylene production processes.

---

The present invention relates to a plasticising composition useful in particular as a plasticiser for chlorine containing polymers such as polyvinyl chloride (PVC).

Di-esters of o-phthalic acid are commonly used as plasticisers for chlorine containing polymers such as PVC. The esters are usually derived from alkanols containing 4 to 14 carbon atoms, e.g. iso-octanol, 2-ethyl hexanol, isodecanol, tridecanol and isoheptanol. o-Phthalic acid has been found to be the best dibasic acid for making general purpose plasticisers conferring a number of desirable properties on the product. Other related acids such as terephthalic acid are not as suitable as o-phthalic acid for a variety of reasons. Thus they may be difficult to esterify or they may produce undesirable properties in the plasticiser produced. The popularity of o-phthalic acid places a premium on this acid, however, and also on the raw materials, o-xylene and naphthalene from which it is obtained. We have now found a plasticising composition which comprises di-esters in which the o-phthalic acid is replaced by a readily available mixture of acids. Many of the properties of this novel plasticising composition are equal to or better than those of the equivalent o-phthalate esters.

The invention provides therefore a plasticising composition which comprises a mixture of the di-esters of one or more alkanols containing 4 to 14 carbon atoms with a mixture of acids comprising o-phthalic acid, isophthalic acid, terephthalic acid, trimesic acid and trimellitic acid.

The esters may be derived from the respective acids or, when they exist, the anhydrides of these acids may be substituted for the acids themselves.

Di-esters of other acids may also be present in the mixture, e.g. di-esters of pyromellitic acid.

The alkanols used to produce the esters are preferably primary alkanols, primary alkanols containing 7 to 13 carbon atoms being particularly suitable. In general the alkanols currently used in the form of their o-phthalate esters may also be used in the composition of the present invention. Such alkanols include, isoheptanol, iso-octanol, isodecanol, 2-ethylhexanol, tridecanol and the mixture of $C_7$ to $C_9$ alkanols made from cracked wax olefines containing 6 to 8 carbon atoms by the "OXO" process and sold under the trademark "Alpanol."

The composition of the mixture of acids may be varied provided that an effective amount of each acid is present. Suitably each acid is present in a concentration in the range 5 to 50, preferably 10–40% by weight, although concentrations outside this range may be used. A convenient source of these acids is by oxidation of a $C_8$ to $C_{10}$, or preferably $C_8$ to $C_9$ fraction derived from benzene, toluene and p-xylene production processes. These aromatic hydrocarbons are derived by extraction processes from various hydrocarbon fractions of petroleum origin, for example, naphtha which has undergone reforming processes to increase its aromatic hydrocarbon content or naphtha which has been steam cracked and from which the consequent ethylene, propylene and C–4 and C–5 hydrocarbons have been removed. After the benzene, toluene and p-xylene have been removed from these petroleum fractions there remain the $C_8$ to $C_{10}$ fractions. Such fractions are obtained as by-product mixtures and contain a large number of alkyl benzenes which are often of little value except as solvents or fuel. A typical fraction contains the followng alkyl benzenes:

(0.2%) ethyl benzene
(2.5%) (3.1%) o-, and p-xylene
(0.5%) isopropyl benzene
(0.1%) (4.5%) n-propyl benzene
(9.8%) (6.5%) hemimellitene
(5.2%) (23.6%) 3- and 4-ethyl toluene
(1.5%) (7.6%) 2-ethyl toluene
(13.2%) (10.1%) mesitylene
(51.7%) (29.1%) pseudocumene
(16.0%) (14.6%) $C_{10}$ alkyl benzenes The figures in brackets indicate typical weight percentages of such compositions. A narrower boiling fraction than the above is generally preferred because on oxidation such a fraction can give an acid mixture free from unwanted benzoic acid. An example of one such narrow boiling fraction has the following composition:

50% w./w. 3- and 4-ethyl toluene
12% mesitylene
12% 2-, ethyl toluene
26% 1,2,4 trimethyl benzene (pseudocumene).

Oxidation of these mixtures by, for example vanadium catalysed vapour phase oxidation or liquid phase bromine assisted oxidation converts the alkyl groups to carboxyl groups. Removal of any benzoic acid formed leaves an acid mixture suitable for the production of the plasticising composition according to the present invention.

The di-esters are produced by esterification of the alkanol with the acid mixture preferably in the presence of a catalyst. Suitable catalysts include mineral acids such as sulphuric acid and phosphoric acid, organic sulphonic acids such as alkylbenzene sulphonic acids, e.g. p-toluene sulphonic acid, aluminium oxide or tin salts. Titanium or zirconium alkoxides, e.g. titanium isopropoxide are preferred because they are highly active and minimise the reaction time. Using this latter type of catalyst the esterification may be carried out at a temperature of approximately 180° C. rising to approximately 230° C. during the course of the reaction at atmospheric pressure and may be either batchwise or continuous. If an acid catalyst such as sulphuric acid is used the esterification is preferably conducted at a lower temperature, namely 135–155° C., and under reduced pressure, e.g. 100 mm. initially falling to 50 mm. as the reaction proceeds. In both types of process an inert atmosphere is desirable, e.g. a nitrogen atmosphere. The water co-produced in the esterification may be removed by distillation during the course of the reaction either alone or entrained with the alkanol reactant. If desired, an entrainer such as benzene or toluene may be added to facilitate the removal of the water. Generally it is advantageous to use an excess of alkanol over the stoichiometric amount required to form the di-esters. Suitably a 10–25% excess is used.

The composition according to the present invention is preferably incorporated in the PVC in a concentration of 10 to 50%, more preferably 25–40% by weight. Other additives such as antioxidants, fillers, pigments and calcium and lead salt stabilizers may also be present.

The invention will now be further described with reference to the following examples.

EXAMPLE (a) Preparation of plasticising composition 200 grams of an acid mixture comprising:

| | Percent w./w. |
|---|---|
| o-Phthalic acid | 12 |
| Iso-phthalic acid | 33 |
| Terephthalic acid | 16 |
| Trimesic acid | 12 |
| Trimellitic acid | 27 | was mixed with iso-octanol 436 grams and 0.3 gram titanium isopropoxide. The resulting mixture was rapidly heated to reflux and maintained at this temperature until 46 mls. water had been collected. The alkanol content of the reaction mixture was then reduced to 2% by blowing nitrogen through the liquid and the temperature was reduced to 120° C. 4 grams of activated charcoal were next added and the mixture was stirred for 30 minutes to remove the catalyst. The filtered mixture was steam stripped at 120° C. and 100 mm. Hg pressure in the presence of more activated charcoal and finally refiltered.

This preparative technique was also followed replacing the iso-octanol by 2-ethyl hexanol and isoheptanol. In all three preparations complete solution of the mixed acids in the reaction mixture did not occur until the final stages of the esterification reaction, but low residual acid values were achieved.

(b) Examination of plasticising properties

The esters were incorporated into the following formulation:

A

| | Parts by weight |
|---|---|
| Polyvinylchloride | 100 |
| Plasticiser | 50 |
| White lead paste | 8 |
| Calcium stearate | 1 |

The composition was milled at 140°/150° C. for 10 minutes and pressed at 170° C. to 0.050-inch thick sheets for preliminary investigation.

Following the initial investigation the 2-ethylhexyl ester was evaluated at a number of concentrations in the following formulations:

B

| | Parts by weight |
|---|---|
| Polyvinyl chloride | 100 |
| 2-ethylhexyl ester | 30, 40, 50, 60, 70 and 80 |
| Tribasic lead sulphate | 4 |
| Calcium stearate | 1 |

Di-2-ethylhexyl-o-phthalate was also evaluated for comparison in both series of tests.

The properties of the PVC formulations were evaluated by the tests laid down in the British Standard 2,782/1965.

Results

Formulation A.

TABLE I

| Ester | Di-2-ethyl-hexyl-o-phthalate | 2-ethyl hexyl ester | Iso-octyl ester | Iso-heptyl ester |
|---|---|---|---|---|
| British Standard Softness | 35.5 | 26.5 | 24.0 | 30.5 |
| Cold flex temperature, ° C | −17.5 | −13.75 | −10.0 | −13.5 |
| 100% modulus, kg./sq. cm | 106 | 125 | 129 | 115 |
| Tensile strength, kg./sq. cm | 209 | 227 | 224 | 223 |
| Elongation, percent | 320 | 342 | 332 | 337 |
| Volume resistance, ohm-cm.$\times 10^{13}$ | 5.31 | 26.7 | 34.4 | 9.13 |
| Carbon volatility, percent weight loss: | | | | |
| 4 days | 2.28 | 1.04 | 2.07 | 2.62 |
| 8 days | 4.91 | 2.34 | 3.79 | 5.26 |
| 11 days | 6.97 | 3.23 | 4.96 | 7.05 |
| 14 days | 8.09 | 3.72 | 5.64 | 8.08 |

The results from formulations B are shown in Table II and on the attached graphs in which "British Standard Softness" has been plotted against a variety of ancillary properties. Thus the properties of the plasticisers can be compared at a fixed "plasticising" effect.

TABLE II

| | 30 | 40 | 50 | 60 | 70 | 80 | Di-2-ethyl-hexyl-o-phthalate |
|---|---|---|---|---|---|---|---|
| British Standard Softness | 4.0 | 13.0 | 27.0 | 40.0 | 55.0 | 66.0 | 34.5 |
| Cold flex temperature,° C | +15.25 | −1.50 | −14.0 | −23.0 | −32.0 | −37.5 | −17.25 |
| 100% modulus, kg/sq. cm | 218 | 166 | 121 | 89 | 67 | 54 | 105 |
| Tensile strength kg./sq. cm | 274 | 235 | 205 | 183 | 160 | 140 | 196 |
| Elongation, percent | 274 | 297 | 321 | 345 | 371 | 378 | 315 |
| Volume resistance, ohm-cm.$\times 10^{13}$ | 156 | 132 | 59.6 | 14.3 | 4.67 | 1.92 | 15.4 |
| Carbon volatility, percent weight loss: | | | | | | | |
| 1 day | 0.26 | 0.23 | 0.29 | 0.20 | 0.25 | 0.36 | 1.68 |
| 4 days | 0.56 | 0.70 | 0.83 | 0.70 | 0.96 | 0.96 | 3.90 |
| 7 days | 0.80 | 1.08 | 1.28 | 1.27 | 1.48 | 1.54 | 4.81 |
| 11 days | 1.20 | 1.68 | 1.88 | 1.90 | 2.22 | 2.39 | 5.69 |
| 14 days | 1.36 | 2.07 | 2.24 | 2.33 | 2.61 | 2.90 | 6.06 |

Discussion

The results from formulation A show that although on a wt./wt. basis the esters in accordance with the present invention do not show quite as high plasticising efficiency (British Standard Softness) as the orthophthalate the ancillary properties are as good as and in some instances better than the orthophthalate. This effect is demonstrated more clearly in the graphs based on formulation B, where for a given Standard Softness important properties such as electrical resistivity and cold flex temperature are seen to be better than for the orthophthalate. The volatility loss on accelerated heat ageing of octyl esters of the mixed acids was also much less in tests using both formulation A and formulation B than that of di-2-ethylhexyl-o-phthalate.

The 2-ethylhexyl ester of the mixed acids was compared with 2-ethylhexyl-o-phthalate for rate of gelation in PVC on a Brakender plastograph using formulation B with 50 parts of each plasticiser. The times to complete gelation were comparable.

What is claimed is:

1. A plasticizing composition consisting essentially of a mixture of the di-esters of an alkanol containing 4 to 14 carbon atoms with a mixture of acids consisting essentially of o-pthalic acid, isophthalic acid, terephthalic acid, trimesic acid and trimellitic acid, the mixture of acids containing each said acid in a concentration in the range 5 to 50% by weight.

2. A plasticizing composition consisting essentially of a mixture of the di-esters of an alkanol containing 4 to 14 carbon atoms with a mixture of acids consisting essentially of o-phthalic acid, isophthalic acid, terephthalic acid, trimesic acid, trimellitic acid, and pyromellitic acid, the mixture of acids containing each said acid in a concentration in the range 5 to 50% by weight.

3. A plasticizing composition consisting essentially of a mixture of the di-esters of one or more primary alkanol containing 7 to 13 carbon atoms with a mixture of acids consisting essentially of o-phthalic acid, isophthalic acid, terephthalic acid, trimesic acid and trimellitic acid, the mixture of acids containing each said acid in a concentration of the range 5 to 50% by weight.

4. The composition of claim 3 which comprises di-esters of one or more of isoheptanol, iso-octanol, isodecanol, 2-ethylhexanol, tridecanol or a mixture of $C_7$ to $C_9$ alkanols made from cracked wax olefines containing 6 to 8 carbon atoms by the Oxo process.

5. The composition of claim 1 in which the mixture of acids is obtained by the oxidation of a $C_8$ to $C_{10}$ fraction derived from benzene, toluene and xylene production processes.

6. The composition of claim 5 in which the mixture of acids is obtained by the oxidation of a $C_8$ to $C_9$ fraction derived from benzene, toluene and xylene production processes.

7. The composition of claim 6 in which the fraction comprises 2-, 3- and 4-ethyl toluene, mesitylene and pseudocumene.

References Cited

UNITED STATES PATENTS

| | | | |
|---|---|---|---|
| 2,936,320 | 5/1960 | Benoit | 260—475 |
| 3,047,612 | 7/1962 | Pennington et al. | 260—475 |
| 1,848,724 | 3/1932 | Jaeger | 260—475 |

FOREIGN PATENTS

| | | | |
|---|---|---|---|
| 852,110 | 10/1960 | Great Britain | 260—475 |

LORRAINE A. WEINBERGER, Primary Examiner

E. J. SKELLY, Assistant Examiner

U.S. Cl. X.R.

260—31.8 R, 475 A